US011906380B2

(12) United States Patent
Tang et al.

(10) Patent No.: US 11,906,380 B2
(45) Date of Patent: Feb. 20, 2024

(54) BRIDGE VOLTAGE INVERSION CIRCUIT FOR VACUUM GAUGE AND PRESSURE GAUGE SENSOR HAVING THE VOLTAGE INVERSION CIRCUIT

(71) Applicant: SUMITOMO (SHI) CRYOGENICS OF AMERICA, INC., Allentown, PA (US)

(72) Inventors: Howard H. Tang, San Diego, CA (US); Scott Michael Harris, San Diego, CA (US)

(73) Assignee: SUMITOMO (SHI) CRYOGENICS OF AMERICA, INC., Allentown, PA (US)

(*) Notice: Subject to any disclaimer, the term of this patent is extended or adjusted under 35 U.S.C. 154(b) by 337 days.

(21) Appl. No.: 17/603,959

(22) PCT Filed: Apr. 23, 2020

(86) PCT No.: PCT/US2020/029487
§ 371 (c)(1),
(2) Date: Oct. 15, 2021

(87) PCT Pub. No.: WO2020/231613
PCT Pub. Date: Nov. 19, 2020

(65) Prior Publication Data
US 2022/0196502 A1  Jun. 23, 2022

Related U.S. Application Data

(60) Provisional application No. 62/848,326, filed on May 15, 2019.

(51) Int. Cl.
*G01L 9/00* (2006.01)
*G01L 9/12* (2006.01)
*G01L 21/12* (2006.01)

(52) U.S. Cl.
CPC ............ *G01L 21/12* (2013.01); *G01L 9/0051* (2013.01); *G01L 9/12* (2013.01)

(58) Field of Classification Search
CPC ... G01L 9/0072; G01L 9/0073; G01L 9/0075; G01L 9/12; G01L 9/125; G01L 21/12
See application file for complete search history.

(56) References Cited

U.S. PATENT DOCUMENTS 2,558,190 A * 6/1951 Miller ................... G01L 9/0095
600/487
3,271,669 A * 9/1966 Lode ..................... G01L 9/0072
324/609
(Continued)

FOREIGN PATENT DOCUMENTS

CN       105659053 A     6/2016
GB       1090815 A      11/1967
(Continued)

OTHER PUBLICATIONS

Japanese Decision to Grant a Patent dated Feb. 28, 2023 for the Corresponding Japanese Patent Application No. 2021-568285.
(Continued)

*Primary Examiner* — Herbert K Roberts
(74) *Attorney, Agent, or Firm* — KATTEN MUCHIN ROSENMAN LLP (57) ABSTRACT

The disclosed invention provides a bridge voltage inversion circuit for vacuum gauge and a pressure gauge sensor that includes the bridge voltage inversion circuit. The bridge voltage inversion circuit for a pressure gauge includes a reference capacitance, a sensor capacitance, and a transformer including a primary winding and a secondary winding that outputs a bridge voltage. The reference capacitor is connected to a first side of the secondary winding of the transformer, and the sensor capacitor is connected to a second side of the secondary winding of the transformer.
(Continued)

The sensor capacitor senses and responds to a pressure, and a capacitance of the sensor capacitor is at a minimum when the pressure is at vacuum. The capacitance of the sensor capacitor at vacuum is less than a capacitance of the reference capacitor.

18 Claims, 6 Drawing Sheets

(56) References Cited

U.S. PATENT DOCUMENTS

| | | | | |
|---|---|---|---|---|
| 4,322,977 | A * | 4/1982 | Sell | G01L 9/0086 |
| | | | | 324/662 |
| 4,422,125 | A * | 12/1983 | Antonazzi | G01L 9/0086 |
| | | | | 73/718 |
| 4,823,603 | A * | 4/1989 | Ferran | G01L 9/0072 |
| | | | | 361/283.4 |
| 5,049,878 | A * | 9/1991 | Stern | G01F 23/266 |
| | | | | 73/304 C |
| 5,942,692 | A * | 8/1999 | Haase | G01L 9/12 |
| | | | | 361/283.4 |
| 6,734,659 | B1 * | 5/2004 | Fortner | G01L 9/12 |
| | | | | 324/123 R |
| 8,997,548 | B2 | 4/2015 | Ferran et al. | |
| 9,787,195 | B1 | 10/2017 | Xiong et al. | |
| 2008/0034879 | A1 * | 2/2008 | Maiorana | G01L 9/12 |
| | | | | 361/15 |
| 2008/0255787 | A1 * | 10/2008 | Sullivan | G01L 19/02 |
| | | | | 73/1.62 |
| 2014/0224027 | A1 * | 8/2014 | Ferran | G01L 9/0016 |
| | | | | 73/724 |
| 2015/0185105 | A1 * | 7/2015 | Ferran | G01L 27/005 |
| | | | | 73/1.58 |
| 2015/0346044 | A1 | 12/2015 | Mullis et al. | |
| 2016/0305838 | A1 | 10/2016 | Wiesbauer et al. | |

FOREIGN PATENT DOCUMENTS

| | | |
|---|---|---|
| JP | 58-211617 A | 12/1983 |
| JP | 1-307632 A | 12/1989 |
| JP | 3-64813 B2 | 10/1991 |
| JP | 04-218416 A | 8/1992 |
| JP | 10-47993 A | 2/1998 |
| JP | 2813070 B2 | 10/1998 |
| JP | 2016-505145 A | 2/2016 |
| JP | 6125049 B2 | 4/2017 |

OTHER PUBLICATIONS

Chinese Office Action dated Jun. 2, 2023 for the Corresponding Chinese Patent Application No. 202080034156.5.
Korean Office Action dated Jun. 21, 2023 for the Corresponding Korean Patent Application No. 10-2021-7041030.
International Search Report and Written Opinion dated Aug. 7, 2020, from PCT/US2020/029487, 9 sheets.
Japanese Office Action dated Nov. 22, 2022 for the Corresponding Japanese Patent Application No. 2021-568285.
Extended European Search Report dated Dec. 22, 2022 for the Corresponding European Patent Application No. 20805361.1.

* cited by examiner

BRIDGE VOLTAGE INVERSION CIRCUIT FOR VACUUM GAUGE AND PRESSURE GAUGE SENSOR HAVING THE VOLTAGE INVERSION CIRCUIT

CROSS REFERENCE TO RELATED APPLICATIONS

This application claims the priority of U.S. Provisional Application Ser. No. 62/848,326, filed on May 15, 2019, entitled "BRIDGE VOLTAGE INVERSION CIRCUIT FOR VACUUM GAUGE AND METHODS OF OPERATING SAME," which is hereby incorporated herein by reference in its entirety.

TECHNICAL FIELD

The present invention relates generally to sensor analog front end circuits that can be found in present vacuum gauge (e.g., WYDE Gauge™) unit's analog boards, and more specifically a performance enhancement for the WYDE Gauge unit's analog boards with less circuit bill of material (BOM) and less power consumption while achieving better manufacturability. Basic concept can also be extended to other types of gauges.

BACKGROUND

Figure 1:
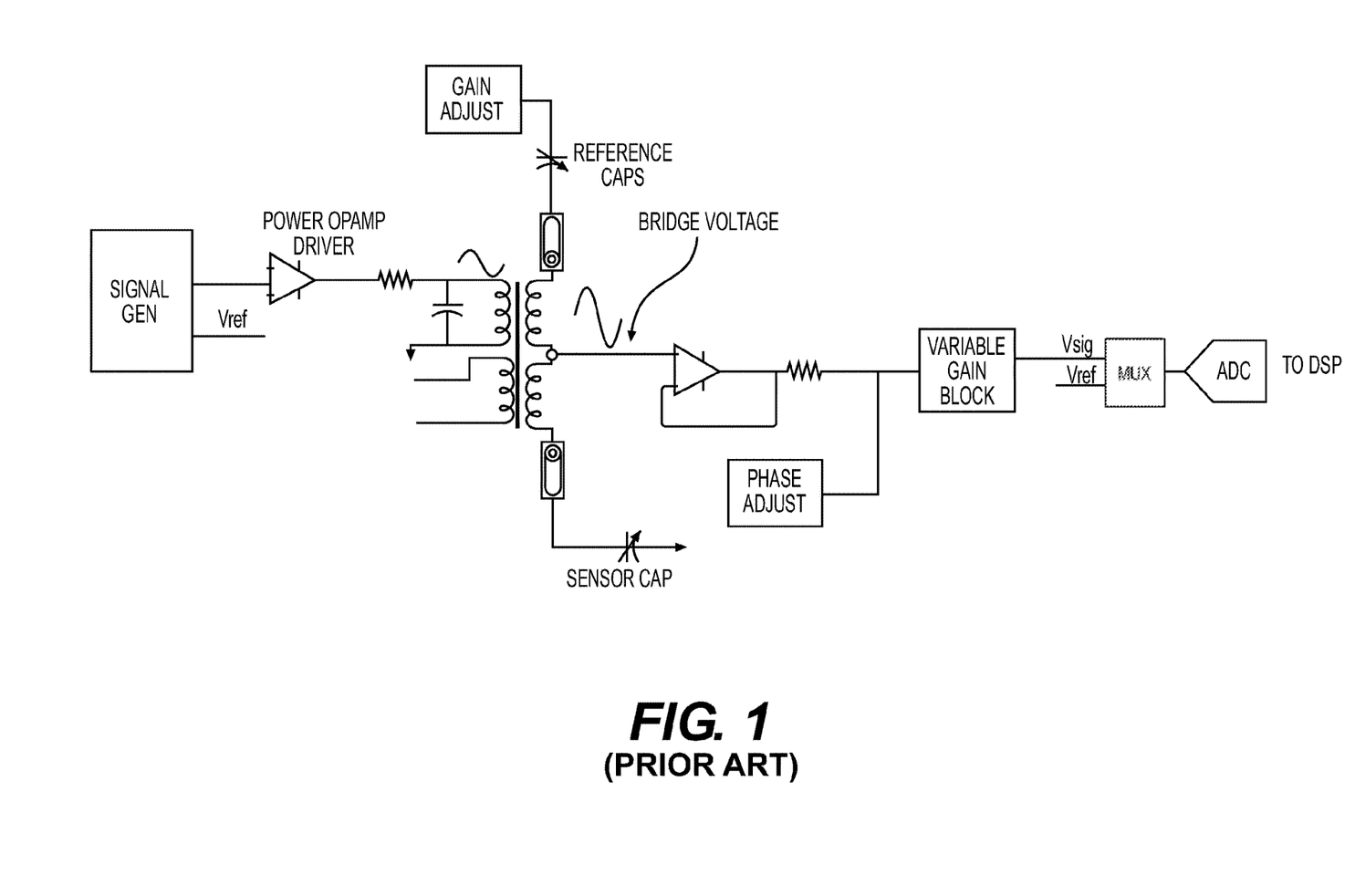
FIG. 1 is a circuit diagram of a prior art WYDE Gauge™ vacuum gauge analog front end circuit.
Figure 2:
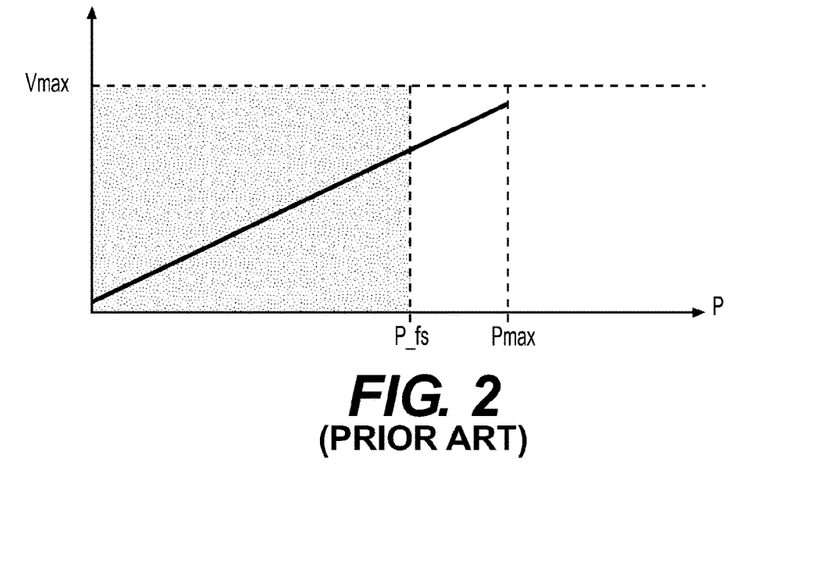
FIG. 2 is a chart illustrating the voltage amplitude to applied pressure relationship in circuit of FIG. 1.

In present vacuum gauge (e.g., WYDE Gauge™) analog front end electronic designs, as shown in FIG. 1, the pressure reading is a direct result of the signal amplitude appearing on the bridge node of the transformer circuit's secondary winding. However, due to the proportional nature between the voltage amplitude and applied pressure, at low pressures, signal amplification is often a necessity, as shown in FIG. 2. At or close to vacuum pressure, signal amplification often times needs to be very high before being presented to an analog-to-digital converter ("ADC") for digitization. This high level of signal amplification creates the problem of an unpredictable phase relationship between the reference wave and the amplified signal wave itself along with unwanted noise injection and amplifier nonlinearity. Consequently, it is desirable to have the best signal quality at vacuum without too much signal gain.

The signal amplitude that appears on the bridge voltage is a function of the transformer's primary side signal amplitude as well as the change in sensor capacitance in relation to the reference capacitance due to pressure change. Prior art solutions to these problems include:

Multiple, expensive gain/phase adjust blocks:

Multiple, expensive gain/phase adjust integrated circuits ("ICs") are used to 1) cancel the phase relationship uncertainty due to amplification and 2) fine-adjust the reference capacitor or "zero" the amplitude at or close to vacuum pressure. These IC parts are necessary since they are a direct result of signal amplification and the need to match reference capacitors and sensor capacitors at vacuum pressure level.

Cumbersome firmware fixing the discontinuity between each amplification decades.

Due to variable gain that amplifies with finite gain at a time in discrete steps, often times linearity curve sections between each of the gain stages can present discontinuity due to switch-over point inaccuracies. A lot of firmware code has been written to handle such complications. Even worse, microprocessors in the digital signal processor (DSP) board have to be aware of the signal level at a particular amplification factor or risk the signal amplitude saturating the next amplification stage.

Amplification of noise signal along with the signal itself due to low signal to noise ratio (SNR).

Figure 3:
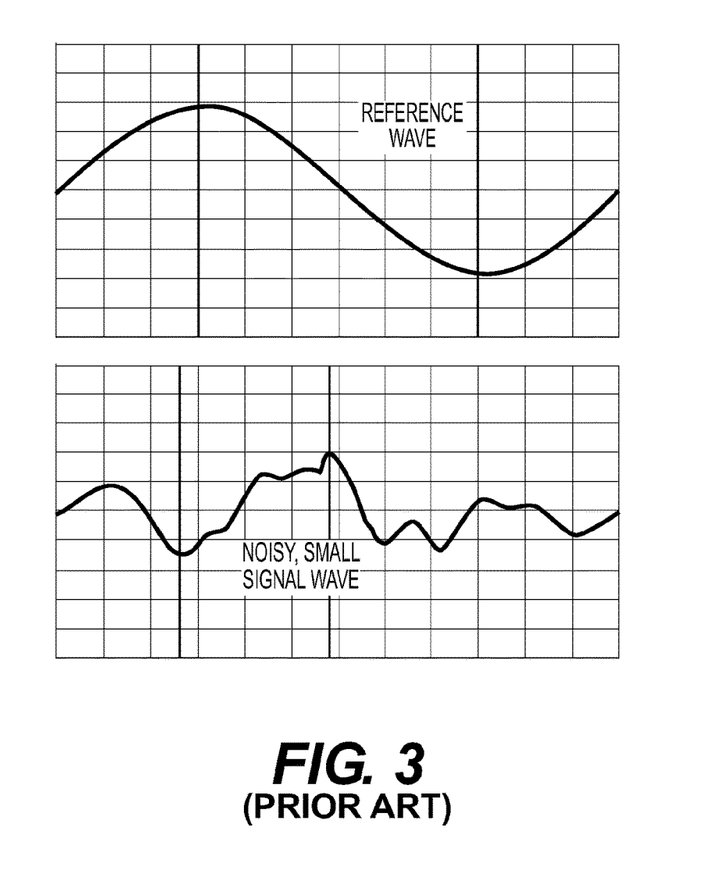
FIG. 3 is a diagram illustrating a reference signal and a noisy signal from a prior art vacuum gauge.

At vacuum pressure levels, the effective SNR is very small, often times when amplification factor is large, the ADC does not "see" a pure sinewave any more, as shown in FIG. 3. Consequently, signal quality is compromised as a result of amplification and noise. Unfortunately, this problem is exacerbated for low pressure gauges that operate at 1 Torr or lower.

Signal averaging.

Due to poor SNR at low pressure levels, the number of signal averaging in digital domain needs to be increased. This has the negative effect of slowing pressure transient response down.

Additional circuitry noise injection.

Along with the distortion of the variable gain block that could be introduced along the signal paths, there are other opportunities for noise to be injected from places such as the power supply and ground before presenting to the ADC.

SUMMARY

What is needed is an improvement to the existing sensor analog front end circuit that can be found in the present WYDE Gauge unit's analog boards. Embodiments herein provide a performance enhancement with less circuit BOM and thus less power consumption while achieving better manufacturability. Embodiments are specifically targeted towards the challenging low pressure SNR requirements. Embodiments offer many advantages over the prior art in areas such as manufacturability, simplicity, and saving of circuit components while maintaining equal or better performance compared to its predecessors. In addition, embodiments are invaluable for low pressure gauges at or below one Torr (1 Torr) full scale. As opposed to the prior art, embodiments provide the best signal quality at vacuum.

Embodiments of a bridge voltage inversion circuit overcome the disadvantages of the prior art and provide the advantages described above. These and other advantages may be achieved by, for example, a bridge voltage inversion circuit for a pressure gauge that includes a transformer including a primary winding and a secondary winding that outputs a bridge voltage, a reference capacitor connected to a first side of the secondary winding of the transformer, and a sensor capacitor connected to a second side of the secondary winding of the transformer. The sensor capacitor senses and responds to a pressure. A capacitance of the sensor capacitor is at a minimum when the pressure is at vacuum. The reference capacitor and sensor capacitor are selected so that the capacitance of the sensor capacitor at vacuum is less than a capacitance of the reference capacitor. The bridge voltage is at a maximum amplitude when the pressure is at vacuum, and a fold-over-pressure at which the bridge voltage is at the minimum amplitude is greater than a full-scale pressure.

The bridge voltage inversion circuit may further includes a circuit that outputs a reference signal that drives the transformer and a gain setting block for adjusting a signal gain before the transformer. The bridge voltage inversion circuit may further include an analog multiplexer that receives and multiplexes the reference signal and the bridge voltage signal and outputs the multiplexed signals to an analog-to-digital converter. The bridge voltage inversion circuit may further include a buffer that receives and buffers the bridge voltage. The bridge voltage inversion circuit may further include a power OPAMP driver that amplifies the reference signal. The amplified reference signal may be supplied to the primary winding of the transformer. The bridge voltage inversion circuit may further include an amplifier connected to the secondary winding of the transformer that receives and amplifies the bridge voltage signal. The sensor capacitor may be a diaphragm capacitor. The capacitance of the reference capacitor may be ten percent (10%) greater than the capacitance of the sensor capacitor at full scale.

These and other advantages may be achieved by, for example, a bridge voltage inversion circuit for a pressure gauge that includes a transformer including a primary winding and a secondary winding that outputs a bridge voltage, a first sensor capacitor connected to a first side of the secondary winding of the transformer, and a second sensor capacitor connected to a second side of the secondary winding of the transformer. The first and second sensor capacitors sense and respond to a pressure. A capacitance of the second sensor capacitor is at a minimum when the pressure is at vacuum. The first sensor capacitor and the second sensor capacitor are selected so that the capacitance of the second sensor capacitor at vacuum is less than a capacitance of the first sensor capacitor at vacuum. The bridge voltage is at a maximum amplitude when the pressure is at vacuum, and a fold-over pressure at which the bridge voltage is at the minimum amplitude is greater than a full-scale pressure. The first sensor capacitor and the second sensor capacitor may be diaphragm capacitors.

These and other advantages may be achieved by, for example, a pressure gauge sensor that includes a transformer including a primary winding and a secondary winding that outputs a bridge voltage, a first capacitor with one end at which pressure is applied and another end connected to a first side of the secondary winding of the transformer, and a second sensor capacitor with one end at which the pressure is applied and another end connected to a second side of the secondary winding of the transformer. The first and second sensor capacitors sense and respond to a pressure. A capacitance of the second sensor capacitor is at a minimum when the pressure is at vacuum. The first sensor capacitor and the second sensor capacitor are selected so that the capacitance of the second sensor capacitor at vacuum is less than a capacitance of the first sensor capacitor at vacuum. The bridge voltage is at a maximum amplitude when the pressure is at vacuum, and a fold-over pressure at which the bridge voltage is at the minimum amplitude is greater than a full-scale pressure.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTIONS

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Embodiments of a bridge voltage inversion circuit for a vacuum pressure gauge/sensor are described herein. Embodiments of the bridge voltage inversion circuit provide the best signal quality at vacuum. As noted above, pressure readings are proportional to the signal amplitude of the bridge voltage; the mismatch of a reference capacitor current versus a sensor capacitor current provides the pressure reading. The reference capacitor is of fixed capacitance. When pressure changes, the sensor capacitor bridge voltage changes proportional to the change in pressure. At vacuum pressure, the amplitude of the bridge voltage is lost due to the presence of noise, and it is difficult to rely on the mismatch between the reference capacitor and the sensor capacitor. It is most desirable, however, to have the best signal at vacuum. Embodiments achieve this desire by inverting the signal so that the largest, rather than the smallest, capacitance difference ($\Delta C$) is present at vacuum pressure.

Presently, there is an industry wide push towards lower full scale (FS) pressure gauges (e.g., ≤1 Torr). This undoubtedly presents a new level of challenge to sensor designers who are familiar with the inner workings of higher pressure gauges (e.g., ≥10 Torr). To answer this challenge, without changing the basic fundamental sensing electrical architecture, embodiments of a bridge voltage inversion circuit provide a sensor circuit with inverted amplitude bridge voltage (aka "INA").

Figure 4:
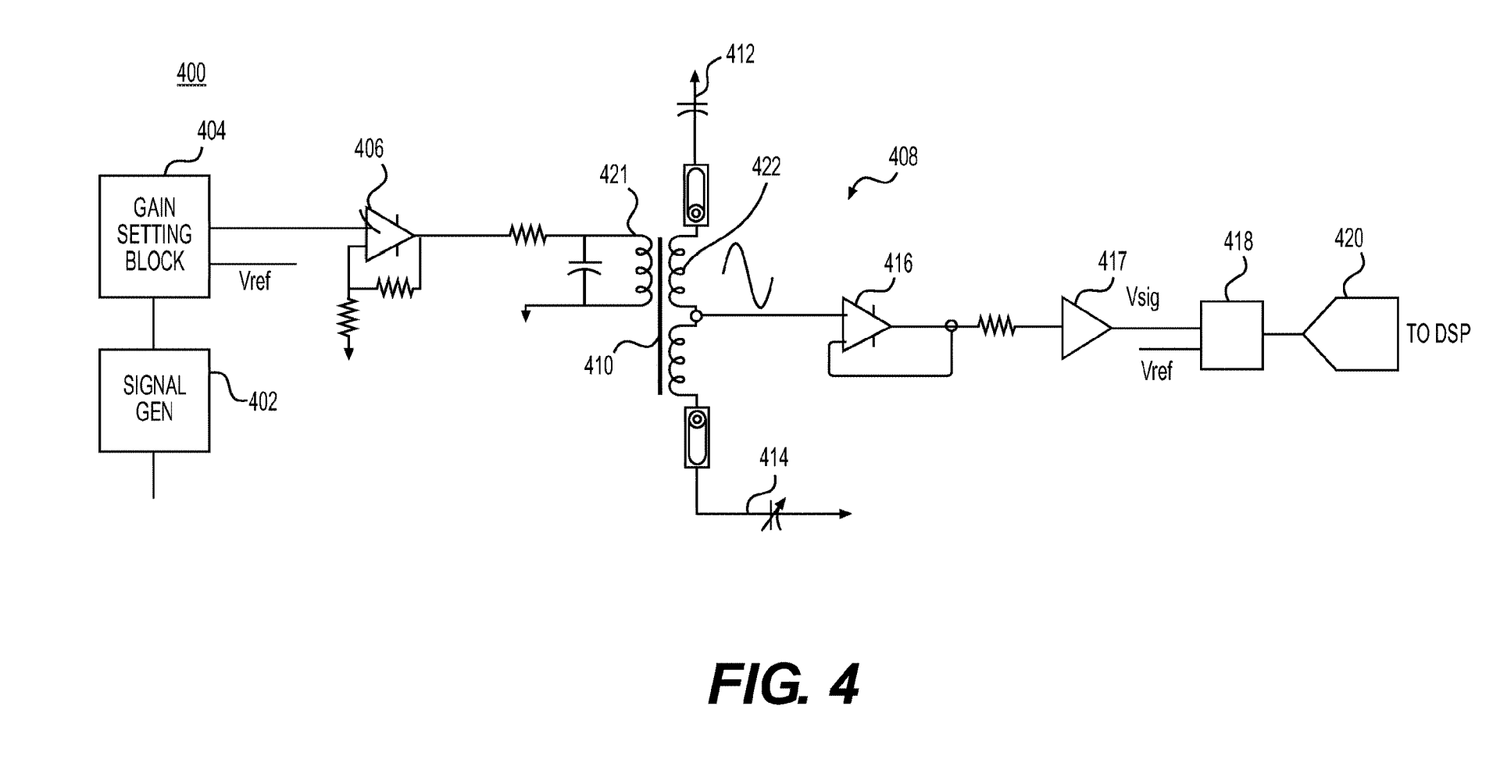
FIG. 4 is a circuit diagram of an embodiment of a bridge voltage inversion circuit for use in a vacuum gauge front end circuit.

With reference now to FIG. 4 shown is an embodiment of a vacuum pressure gauge front-end 400 that includes a bridge circuit 408 that inverts the bridge voltage. In vacuum pressure gauge front end circuits, including prior art circuits such as shown in FIG. 1, sensor electronics consists of a transformer circuit design based on a coaxial cable primary and secondary winding. This transformer circuit design forms the so-called "bridge circuit" 408. The term "bridge" in this context means that there are inductance-capacitance resonance circuits on either side of the transformer 410. The transformer 410 includes a primary winding 421 and a secondary winding 422. The bridge voltage is output from the secondary winding. On one side of the bridge circuit 408, there is reference capacitor 412 to ground and one half the inductance from the secondary winding of the transformer 410. On the other side of the bridge circuit 408, there is the sensor capacitor 414 (e.g., a sensor capacitor for which capacitance increases as pressure increases) to ground and the other half of the inductance from the secondary winding 422 of the transformer 410. The reference capacitor 412 is connected to a first side of the secondary winding 422 of the transformer 410, and the sensor capacitor 414 is connected to a second side of the secondary winding 422 of the transformer 410. The sensor capacitor 414 may be a diaphragm capacitor, but can be any capacitor that changes capacitance based on pressure applied to the capacitor. The reference capacitor 412 is a fixed capacitor having a constant capacitance. If the resonance circuits from each side of the bridge circuit 408 are equal in inductance (L) and capacitance (C) values, then bridge voltage is zero. Whenever there is a mismatch in capacitance values, a sinewave with amplitude proportional to the capacitance mismatch amount would be generated.

In other words, the transduction between pressure and amplitude is generated through the order of pressure, sensor capacitance ($C_{sensor}$), capacitance difference ($\Delta C$), and bridge voltage. In prior art circuits, such as shown in FIG. 1, the capacitance values of the reference capacitor and sensor capacitor are chosen so that the bridge voltage ($V_{amplitude}$) is proportional to pressure. For example, the capacitance of the reference capacitor may be $C_{ref}$ and the capacitance of the sensor capacitor at vacuum may be $C_{sensor}$. As a result, as pressure increases, a positive $\Delta C = C_{ref} - C_{sensor}$ will result. At vacuum, $C_{ref} - C_{sensor}$, the capacitance difference ($\Delta C$) is the highest. The term "full scale pressure" here refers to the maximum pressure where the Gauge's accuracy specification is still guaranteed. For example, many gauges on the market today have full scale in the ranges of 10 Torr or 100 Torr.

With continuing reference to FIG. 4, in embodiments of vacuum pressure gauge front-end 400 with bridge circuit 408 that inverts the bridge voltage, capacitance values of the reference capacitor 412 and sensor capacitor 414 are chosen so that $V_{amplitude}$ is inversely proportional to the pressure. For example, the capacitance of the reference capacitor may be ten percent (10%) greater than the capacitance of the sensor capacitor at full scale. Alternatively, the capacitance ($C_{ref}$) of the reference capacitor 412 may be fifty percent (50%) greater than the capacitance ($C_{sensor}$) of the sensor capacitor 414 at vacuum. For example, the capacitance ($C_{ref}$) of the reference capacitor 412 may be around 300 pF, and the capacitance ($C_{sensor}$) of the sensor capacitor 414 at vacuum may be around 200 pF. The capacitance of the sensor capacitor 414 increases as the pressure at the sensor increases. Accordingly, in embodiments of vacuum pressure gauge front-end 400 with bridge circuit 408, the capacitance difference ($\Delta C$) would be the most negative at vacuum, and the capacitance difference ($\Delta C$) would approach zero (0) at full scale pressure.

A sine wave is used to drive embodiments of vacuum pressure gauge front-end 400. In embodiments, the signal spectral purity needs to be guaranteed in order for an on-board DSP engine to perform digital algorithms, for example, an algorithm to digitally filter out "common" noise between $V_{ref}$ and $V_{sig}$. The sinewave signal, which is generated by a signal generator 402, is passed through a gain setting block 404 which may be used to adjust the signal gain. The signal then is passed through a power OpAmp Driver 406 to drive transformer 410. The power OPAMP driver 406 amplifies the signal, and the amplified signal is supplied to the primary winding 421 of the transformer 410. The signal is also passed to the output of the vacuum pressure gauge front-end 400 as $V_{ref}$.

With continued reference to FIG. 4, the output of bridge circuit 408, i.e., the bridge voltage, may be amplified by an amplifier (a power OpAmp driver) 416 and alternatingly passed as $V_{sig}$ through an analog-to-digital convertor (ADC) 420 with $V_{ref}$ to the on-board DSP engine (not shown). An analog multiplexer 418 receives the reference sine wave and the bridge voltage signal, multiplexes the reference sine wave and the bridge voltage signal, and outputs the multiplexed signals to an analog-to-digital converter. In embodiments shown, winding of transformer 410 consists of a shielded cable (e.g., a coaxial cable), where the center core carries the bridge voltage signal $V_{amplitude}$ and the shield is driven by a unity gain buffer 417 with a replica of the center core signal. This is done to minimize the leakage current between the center conductor and the shield through the capacitances that created this current leakage path. In addition, the shield also prevents external EMI sources from interfering with the signal integrity at the winding center conductor.

In the case of prior art vacuum pressure gauge/sensor, with bridge circuit such as shown in FIG. 1, additional gain/phase adjust and OPAMP circuits are required for tuning the amplitude and phase of the bridge voltage. The need for tuning the amplitude and phase arise from the fact that at vacuum, where the bridge voltage amplitude is the smallest, additional signal gain is required for proper analog-to-digital (AD) conversion. Unfortunately, whenever the signal gain is increased significantly, there is always a risk that the phase relationship between $V_{ref}$ and $V_{sig}$ is altered. As the phase relationship between $V_{ref}$ and $V_{sig}$ become unpredictable, the digital algorithm between $V_{ref}$ and $V_{sig}$ cannot work properly. With the present embodiment of a bridge voltage inversion circuit shown in FIG. 4, these problems are avoided at the most critical pressure levels (i.e., at or near vacuum)-and the additional gain/phase adjust and variable gain circuits shown in FIG. 1 may be omitted.

Figure 5:
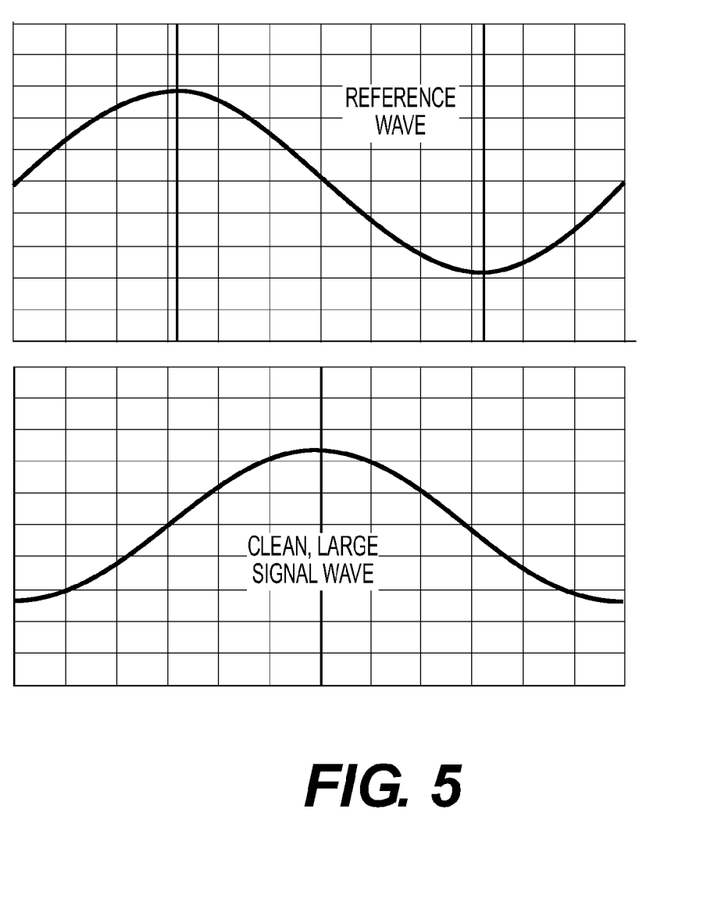
FIG. 5 is a diagram illustrating a reference signal and a clean signal from the embodiment of a bridge voltage inversion circuit shown in FIG. 4.

With reference now to FIG. 5, shown are the sine waves of $V_{ref}$ (Reference Wave) and $V_{sig}$ (clean, large signal wave). The clean, large signal wave shown in FIG. 5 compares quite favorably to the noisy, small signal wave shown in FIG. 2 that is produced by the prior art bridge circuit shown in FIG. 1.

Figure 6:
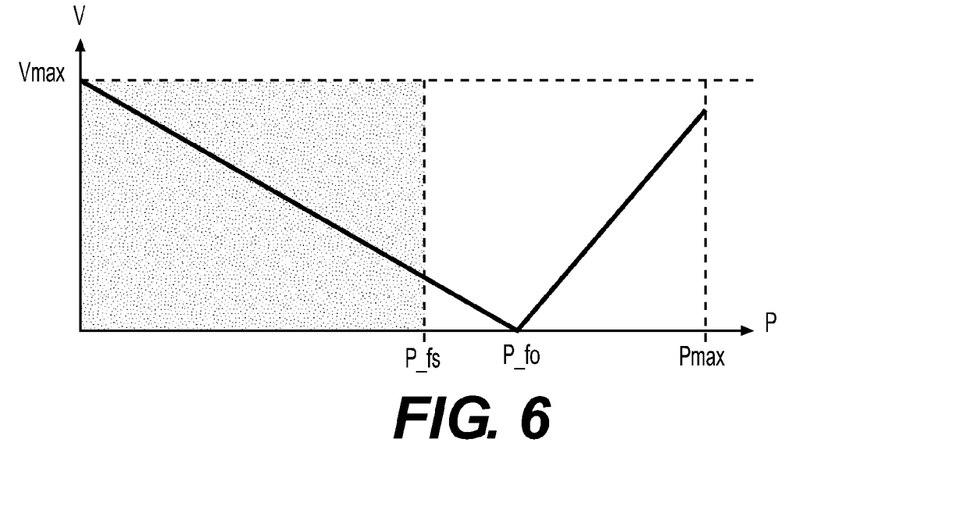
FIG. 6 is a diagram illustrating the voltage amplitude to applied pressure relationship of the embodiment of a bridge voltage inversion circuit shown in FIG. 4.

With reference now to FIG. 6, shown is a voltage-pressure graph showing voltage amplitude to applied pressure relationship of the embodiment of a bridge voltage inversion circuit shown in FIG. 4. Compared to voltage-pressure graph of FIG. 3, we see how bridge signal voltage $V_{amplitude}$ is at maximum ($V_{max}$) at vacuum, slowly decreasing to a minimum (as pressure causes $C_{sensor}$ to increase until $C_{ref}$ is around $C_{sensor}$ which implies $\Delta C$ approaches 0). Further pressure increase as $C_{sensor}$ becomes greater than $C_{ref}$ causes $\Delta C$ to increase again until $V_{max}$ is approached before the sensor capacitor 414 shorts (the capacitor plates touch), as shown as $P_{max}$ in FIG. 6. As illustrated by FIG. 6, the bridge voltage is generated from an absolute value of the capacitance difference $\Delta C$ between $C_{ref}$ and $C_{sensor}$. Consequently, for $C_{ref}$ and $C_{sensor}$, $\Delta C$ will be $C_{ref} - C_{sensor}$ at vacuum and will decrease to ~0 as $C_{sensor}$ approaches $C_{ref}$ at $P_{-fo}$ (foldover pressure). When $C_{sensor}$ increases above $C_{ref}$, $\Delta C$ will increase again as $C_{sensor}$ continues to increase as described herein.

As described herein, embodiments of the bridge voltage inversion circuit bring several added benefits beyond higher performance at or near vacuum pressure:

No amplification needed.

An INA analog sensor circuit does not require additional amplification stages. This is a direct result of amplitude inversion on the bridge, i.e., voltage is lower when pressure increases. Since embodiments of the bridge voltage inversion circuit produce a higher voltage at vacuum, the SNR at vacuum is greatly enhanced.

No need for gain and phase adjustment

The gain and phase adjustments are no longer needed here since the bridge voltage circuit signal does not need to be amplified when pressure is lowered and precise capacitance matching is not necessary either.

Voltage vs. pressure's Linearity monotonicity is guaranteed.

Because there is no discrete gain stages along the signal path, the voltage-pressure curve can be one continuous curve across the entire full scale range of the gauge. This feature avoids the "stitching" of the voltage-pressure curve decade by decade, which greatly simplifies firmware design.

SNR enhancement.

At low pressures, the signal to noise ratio is greatly enhanced as evident from the voltage-pressure plot shown in FIG. 5. As pressure steadily increases, the bridge voltage amplitude ($V_{amplitude}$) decreases. Bridge voltage amplitude continues to decrease past a full scale mark $P_{\_fs}$ (full-scale pressure), eventually diminishing to zero when pressure reaches a "fold over" point $P_{\_fo}$. Past the fold over point $P_{\_fo}$, $V_{amplitude}$ increases again until it reaches $V_{max}$. The diminished signal amplitude at higher pressures should not degrade the reading error percentage at higher pressures.

Signal averaging

Due to enhanced signal-to-noise ratio (SNR) with $V_{amplitude}$ being at or near $V_{max}$ at low pressure levels, there is no need to unnecessarily increase the number of signal averaging in the digital domain.

Reference Capacitor Choices

During the board assembly process, reference capacitor 412 needs to be matched to sensor capacitor 414 at $P_{\_fo}$ where zero amplitude pressure exceeds full scale. The exact location where $P_{\_fo}$ is in relation to $P_{\_fs}$ and can be flexible enough so that capacitors of certain fixed standard size can be picked with enough tolerances built in, as long as $P_{\_fo}$ is greater than $P_{\_fs}$.

Manufacturability

The easiness of using conventional capacitance sizes greatly enhances manufacturability of the sensors. There is no need for amplitude tuning circuitry for precision capacitance matching at vacuum pressure levels.

Gain setting block and shortage protection

In the INA configuration of the bridge voltage inversion circuit 400, a gain setting block 404 is used to adjust the transformer 410 primary amplitudes. The purpose of this gain setting block 404 is to allow extra control of the bridge voltage amplitude in the event of pressure sensor short due to over pressure. Another benefit of using gain setting block 404 for shortage protection is to maintain the same amount of power delivered to the reference capacitor 412 in the event of a over pressure condition.

Figure 7:
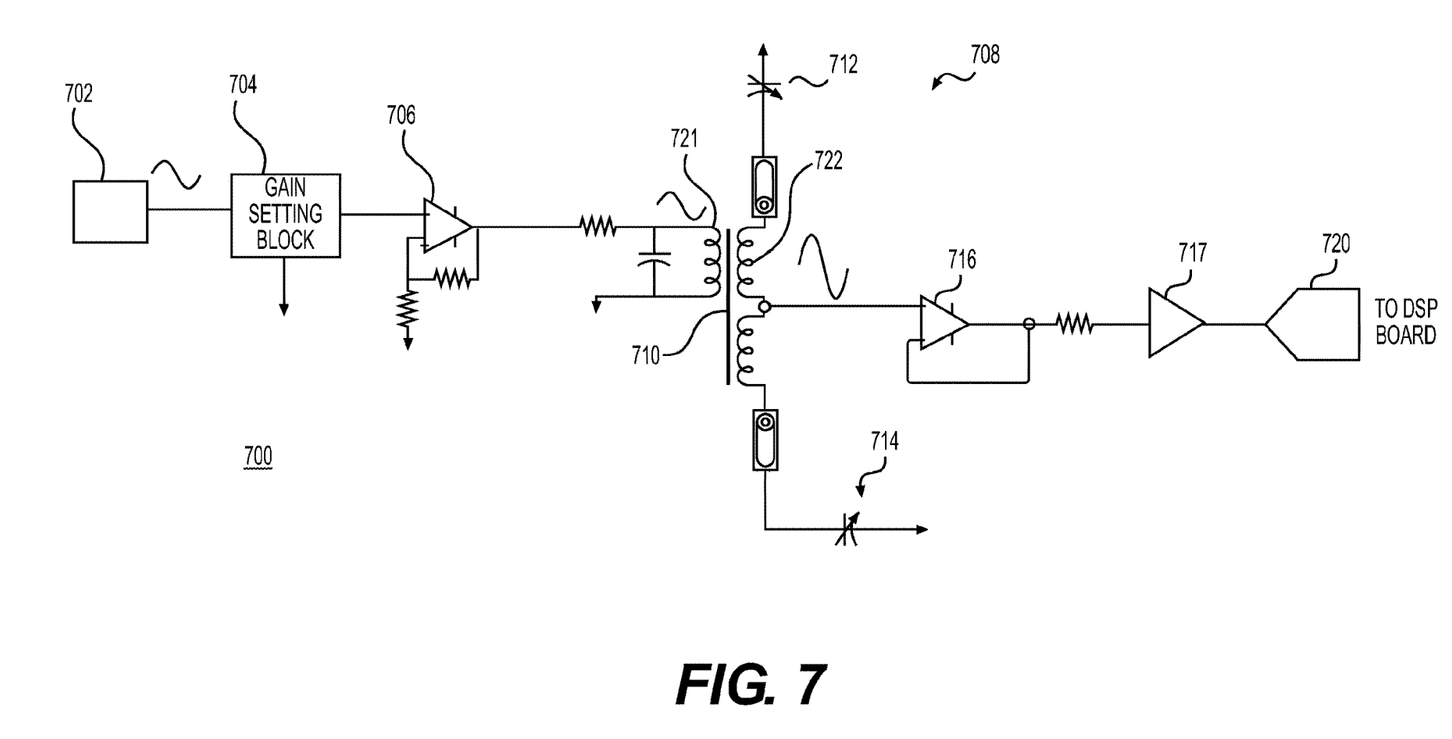
FIG. 7 is a circuit diagram of an embodiment of a bridge voltage inversion circuit for use with multi-electrode sensors.

With reference now to FIG. 7, embodiments of bridge voltage inversion circuit 700 may be used with multi-electrode sensors. As shown in FIG. 7, bridge voltage inversion circuit 700 is used with two sensor capacitors 712 and 714 rather than a single sensor capacitor and a reference capacitor. The sinewave signal, which is generated by a signal generator 702, is passed through a gain setting block 704 which may be used to adjust the signal gain. The signal then is passed through a power OpAmp Driver 706 to drive transformer 710. The power OPAMP driver 706 amplifies the signal, and the amplified signal is supplied to the primary winding 721 of the transformer 710. This transformer 710 circuit design forms the bridge circuit 708. The transformer 710 includes a primary winding 721 and a secondary winding 722. A first sensor capacitor 712 and a second sensor capacitor 714 are part of the multi-electrode sensor and can both vary when pressure is changed. The first sensor capacitor 712 and the second capacity 714 may be diaphragm capacitors, but can be any capacitors that change capacitance based on pressure applied to the capacitors. The first sensor capacitor 712 is connected to a first side of the secondary winding 722 of the transformer 710, and the second sensor capacitor 714 is connected to a second side of the secondary winding 722 of the transformer 710. In the embodiments of the bridge voltage inversion circuit 700, the capacitance $C_{sen1}$ of the first capacitor 712 at vacuum is greater than the capacitance $C_{sen2}$ of the second capacitor 714 at vacuum. Bridge voltage inversion circuit 700 may be used, because the condition $C_{sen1} > C_{sen2}$ always holds true up to $P_{max}$. A multi-electrode of the vacuum gauge sensor is a sensor construction by which external reference capacitors is not used. All sensor related capacitances are integrated in the sensor construction itself. The output of bridge circuit 708, i.e., the bridge voltage, may be amplified by an amplifier (a power OpAmp driver) 716 and alternatingly passed to a buffer 717 that receives and buffers the bridge voltage output from the transformer 710. The output bridge signal from the buffer 717 is passed to an analog-to-digital convertor (ADC) 720 and further to the on-board DSP engine (not shown).

Figure 8A:
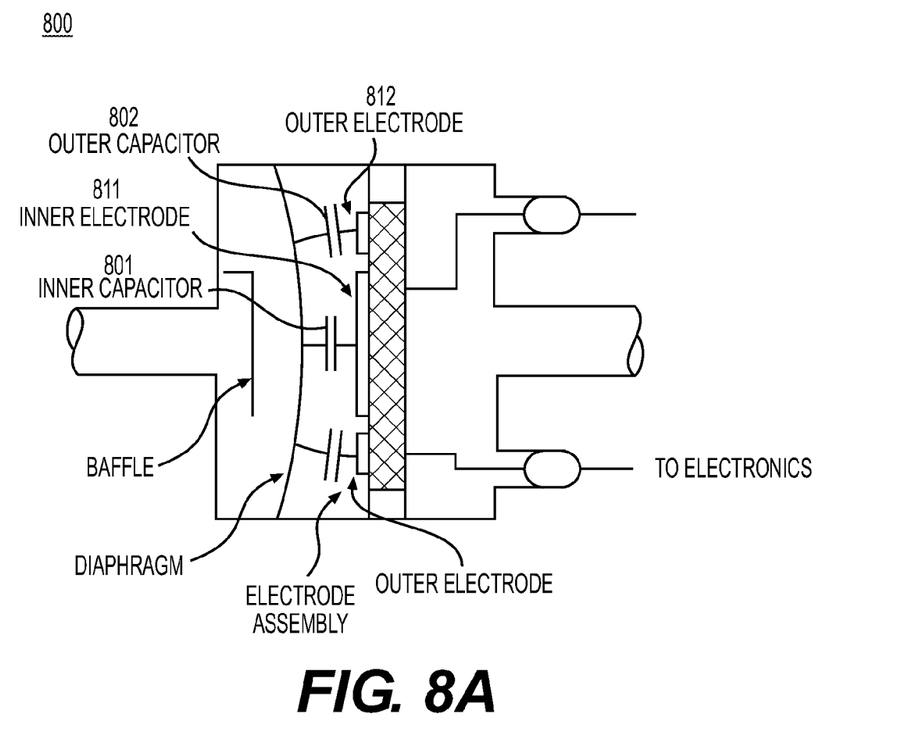
FIGS. 8A and 8B show structures of an exemplary sensor employing the bridge voltage inversion circuit.
Figure 8B:
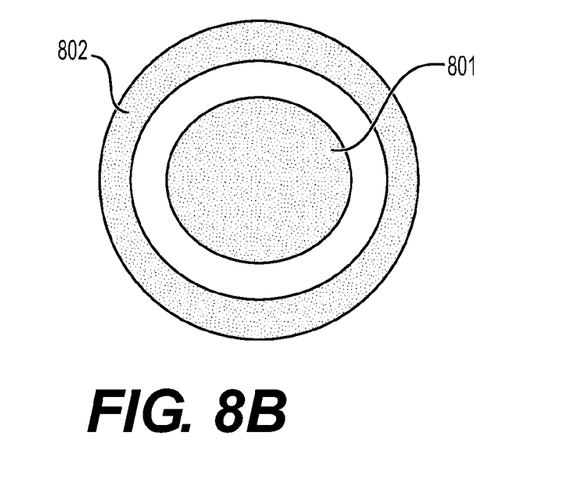

With reference now to FIGS. 8A-8B, shown are structures of an exemplary sensor that employs the bridge voltage inversion circuit of the claimed invention. FIG. 8A sows a side view of the exemplary sensor, and FIG. 8B shows a front view of the sensor. The sensor 800 includes an inner capacitor 801 and an outer capacitor 802. Consequently, the inverted amplitude (NA) approach not only can be applied to the sensor capacitor/reference capacitor sensor construction, as shown in FIG. 4, the concept can be extended to sensors with integrated multiple electrodes, as shown in FIG. 7. More specifically, in the case of inner and outer electrode with concentric circle construction (other geometry variants possible), as shown in FIG. 8, the capacitance between the inner electrode 811 (sensor capacitor 801) and outer electrode 812 (sensor capacitor 802) with respect to a common ground plane often times cannot be perfectly matched during the manufacturing process. INA's way of intentional mismatch lends itself very well for this type of sensor electrode construction. In the exemplary sensor shown in FIG. 8, the inner capacitor 801 may correspond to the first capacitor 712 shown in FIG. 7, and the outer capacitor 802 may correspond to the second capacitor 714. The capacitance difference between the two sensor sides is a design choice based on many other factors, such as the tension of the diaphragm, spacing between diaphragm and electrode(s), sizes and shapes of each electrodes, etc. Therefore generally speaking, the larger the difference between the capacitances for both electrodes, the larger the signal amplitude we would likely have under vacuum conditions.

In conclusion, the inverted bridge voltage amplitude method of generating a signal amplitude inversely related to pressure is presented as part of WYDE Gauge™ platform. This method offers many advantages over the prior art in areas such as manufacturability, simplicity, and saving of circuit components while maintaining equal or better performance compared its predecessors. In addition, this method will prove to be invaluable for low pressure gauges at or below 1 Torr full scale.

The terms and descriptions used herein are set forth by way of illustration only and are not meant as limitations. Those skilled in the art will recognize that many variations are possible within the spirit and scope of the invention.

What is claimed is:

1. A bridge voltage inversion circuit for a pressure gauge, comprising:
    a transformer including a primary winding and a secondary winding that outputs a bridge voltage;
    a reference capacitor connected to a first side of the secondary winding of the transformer, wherein the reference capacitor has a fixed constant capacitance; and
    a sensor capacitor connected to a second side of the secondary winding of the transformer, wherein the sensor capacitor senses and responds to a pressure, a capacitance of the sensor capacitor is at a minimum when the pressure is at vacuum, and the constant capacitance of the reference capacitor is greater than the capacitance of the sensor capacitor at a full scale pressure, and wherein the bridge voltage is at a maximum amplitude when the pressure is at vacuum and a fold-over-pressure at which the bridge voltage is at the minimum amplitude is greater than a full-scale pressure.

2. The bridge voltage inversion circuit for a pressure gauge of claim 1 further comprising:
    a circuit that outputs a reference signal that drives the transformer; and
    a gain setting block for adjusting a signal gain before the transformer.

3. The bridge voltage inversion circuit for a pressure gauge of claim 2 further comprising an analog multiplexer that receives and multiplexes the reference signal and the bridge voltage signal and outputs the multiplexed signals to an analog-to-digital converter.

4. The bridge voltage inversion circuit for a pressure gauge of claim 3 further comprising a buffer that receives and buffers the bridge voltage.

5. The bridge voltage inversion circuit for a pressure gauge of claim 2 further comprising a power OPAMP driver that amplifies the reference signal, wherein the amplified reference signal is supplied to the primary winding of the transformer.

6. The bridge voltage inversion circuit for a pressure gauge of claim 1 further comprising an amplifier connected to the secondary winding of the transformer that receives and amplifies the bridge voltage signal.

7. The bridge voltage inversion circuit for a pressure gauge of claim 1 wherein the sensor capacitor is a diaphragm capacitor.

8. The bridge voltage inversion circuit for a pressure gauge of claim 1 wherein the capacitance of the reference capacitor is ten percent (10%) greater than the capacitance of the sensor capacitor at the full scale pressure.

9. A bridge voltage inversion circuit for a pressure gauge comprising:
    a transformer including a primary winding and a secondary winding that outputs a bridge voltage;
    a first sensor capacitor connected to a first side of the secondary winding of the transformer; and
    a second sensor capacitor connected to a second side of the secondary winding of the transformer, wherein the first and second sensor capacitors sense and respond to a pressure, a capacitance of the second sensor capacitor is at a minimum when the pressure is at vacuum, and the first sensor capacitor and the second sensor capacitor are selected so that the capacitance of the second sensor capacitor at vacuum is less than a capacitance of the first sensor capacitor at vacuum, and wherein the bridge voltage is at a maximum amplitude when the pressure is at vacuum and a fold-over pressure at which the bridge voltage is at the minimum amplitude is greater than a full-scale pressure.

10. The bridge voltage inversion circuit for a pressure gauge of claim 9 further comprising:
    a circuit that outputs a reference signal that drives the transformer; and
    a gain setting block for adjusting a signal gain before the transformer.

11. The bridge voltage inversion circuit for a pressure gauge of claim 9 further comprising a buffer that receives and buffers the bridge voltage.

12. The bridge voltage inversion circuit for a pressure gauge of claim 10 further comprising a power OPAMP driver that amplifies the reference signal, wherein the amplified reference signal is supplied to the primary winding of the transformer.

13. The bridge voltage inversion circuit for a pressure gauge of claim 9 further comprising an amplifier connected to the secondary winding of the transformer that receives and amplifies the bridge voltage signal.

14. The bridge voltage inversion circuit for a pressure gauge of claim 9 wherein the first sensor capacitor and the second sensor capacitor are diaphragm capacitors.

15. A pressure gauge sensor, comprising:
    a transformer including a primary winding and a secondary winding that outputs a bridge voltage;
    a first capacitor with one end at which pressure is applied and another end connected to a first side of the secondary winding of the transformer; and
    a second sensor capacitor with one end at which the pressure is applied and another end connected to a second side of the secondary winding of the transformer, wherein the first and second sensor capacitors sense and respond to a pressure, a capacitance of the second sensor capacitor is at a minimum when the pressure is at vacuum, and the first sensor capacitor and the second sensor capacitor are selected so that the capacitance of the second sensor capacitor at vacuum is less than a capacitance of the first sensor capacitor at vacuum, and wherein the bridge voltage is at a maximum amplitude when the pressure is at vacuum and a fold-over pressure at which the bridge voltage is at the minimum amplitude is greater than a full-scale pressure.

16. The pressure gauge sensor of claim 15 wherein the first sensor capacitor and the second sensor capacitor are diaphragm capacitors.

17. The pressure gauge sensor of claim 15 further comprising a power OPAMP driver that amplifies a reference signal, wherein the amplified reference signal is supplied to the primary winding of the transformer.

18. The pressure gauge sensor of claim 15 further comprising an amplifier connected to the secondary winding of the transformer that receives and amplifies the bridge voltage signal.

* * * * *